United States Patent
Boyer

(10) Patent No.: US 8,562,368 B2
(45) Date of Patent: Oct. 22, 2013

(54) SERVICE DISCONNECT ASSEMBLY

(75) Inventor: James Aric Boyer, Troy, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 168 days.

(21) Appl. No.: 13/178,122

(22) Filed: Jul. 7, 2011

(65) Prior Publication Data
US 2013/0012051 A1    Jan. 10, 2013

(51) Int. Cl.
*H01R 4/50* (2006.01)

(52) U.S. Cl.
USPC .......................... 439/345; 200/501

(58) Field of Classification Search
USPC .......................... 439/345; 200/501
See application file for complete search history.

(56) References Cited

U.S. PATENT DOCUMENTS

| | | | |
|---|---|---|---|
| 5,850,165 A * | 12/1998 | Spriester et al. | 333/100 |
| 5,850,909 A * | 12/1998 | Wagner | 200/501 |
| 5,923,008 A * | 7/1999 | Williams, Jr. | 200/14 |
| 6,081,169 A * | 6/2000 | Romerein et al. | 333/100 |

OTHER PUBLICATIONS

Drawing No. C-1587441, Service Disconnect Fuse Holder (SDFH), Rev. B, Feb. 21, 2007, 1 page, Tyco Electronics.
Drawing No. C-1587756, Service Disconnect Module (SDM), Rev. B, May 9, 2008, 1 page, Tyco Electronics.

* cited by examiner

*Primary Examiner* — Truc Nguyen

(57) ABSTRACT

A service disconnect assembly for a battery assembly includes a receiver configured to hold terminals of a power circuit of the battery assembly and a service disconnect removably coupled to the receiver. The service disconnect has a hub rotatably coupled to the receiver that holds a terminal interconnect configured to electrically connect the terminals together. The service disconnect is removable from the receiver to disconnect the terminals from one another. Rotating the hub in a first direction drives the terminal interconnect into engagement with the terminals and rotating the hub in a second direction opposite to the first direction releases the terminal interconnect from the terminals.

19 Claims, 14 Drawing Sheets

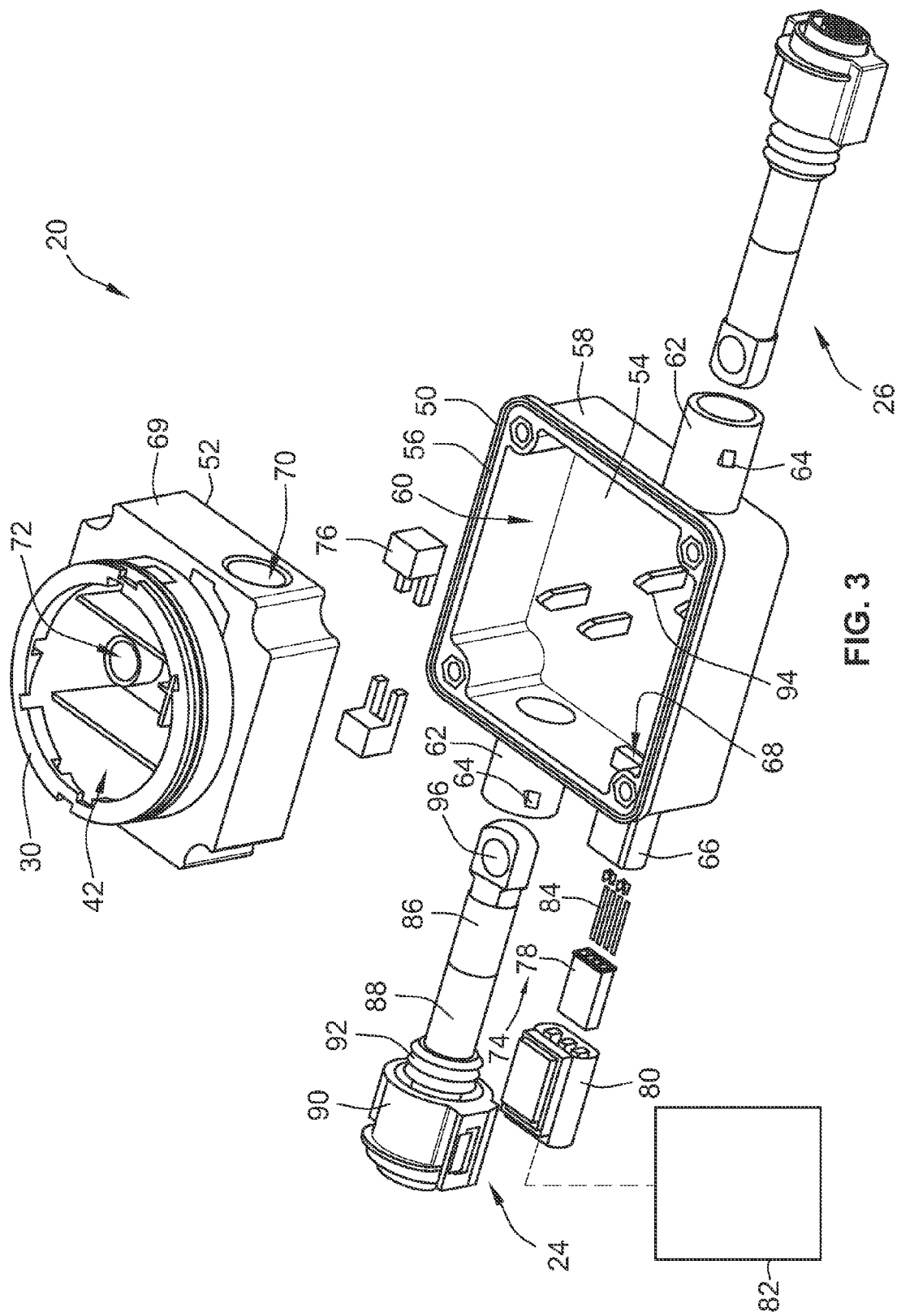

SERVICE DISCONNECT ASSEMBLY

BACKGROUND OF THE INVENTION

The subject matter herein relates generally to battery systems, and more particularly, to service disconnect assemblies for battery systems.

High voltage electronic modules are used as power supplies, such as battery packs for automotive applications. The electronic modules typically include a service disconnect assembly for disconnecting high voltage power from the battery packs to the other components of the vehicle, such as the motor. An exemplary use for the service disconnect assembly is to disconnect the power to protect an operator or technician when servicing or repairing the electronic module, or to protect first responders to an accident. Typically, power terminals of the battery pack are connected to one another by a terminal interconnect associated with a service disconnect element. The terminal interconnect is removed with the service disconnect element to open the power circuit, thus breaking the flow path through the power circuit.

The service disconnect assemblies typically include a high voltage interlock (HVIL) sub-assembly that is adapted to allow or restrict the flow of high voltage based on the operating state of the HVIL sub-assembly. The HVIL sub-assembly consists of either a direct electrical connection or a sensor that senses the presence of a trigger element of the HVIL sub-assembly. When the direct electrical connection is made, or the presence of the trigger element is sensed, a signal is sent to a controller of the electronic module allowing the high voltage to flow through the power circuit. When the direct electrical connection is broken, or when the presence of the trigger element is no longer sensed, then the controller opens the power circuit to restrict the flow of high voltage through the electronic module.

Known service disconnects are mated and unmated by sliding the service disconnect between a mated position and an unmated position. In the unmated position, the service disconnect may be removed. As a safety precaution, the HVIL sub-assembly is unmated prior to the service disconnect being removed, such as to let the high voltage dissipate to avoid arcing between the terminal interconnect and the terminals when the terminal interconnect is removed. The technician is required to wait for a predetermined time period between unmating the HVIL sub-assembly and removing the service disconnect. Known systems have the technician use one tool for unmating the HVIL sub-assembly and then use another tool for removing the service disconnect, working under the theory that the time that it takes for the technician to get the second tool and then use the tool to remove the service disconnect is enough time for the high voltage to dissipate, making it safe to remove the service disconnect. However, such configurations are complicated and un-intuitive. Additionally, such configurations require the technician to have and use different tools, with the potential for loss of the tools. Additionally, with the need of a special tool to unmate the HVIL sub-assembly and remove the service disconnect, the possibility exists of not having the tool and thus not being able to disconnect the high voltage, which could be dangerous and/or time consuming.

A need remains for a service disconnect assembly that allows a technician or operator to safely remove a service disconnect from an electronic module. A need remains for a service disconnect assembly that allows a technician or operator to conveniently remove a service disconnect from an electronic module.

BRIEF DESCRIPTION OF THE INVENTION

In one embodiment, a service disconnect assembly for a battery assembly is provided that includes a receiver configured to hold terminals of a power circuit of the battery assembly and a service disconnect removably coupled to the receiver. The service disconnect has a hub rotatably coupled to the receiver that holds a terminal interconnect configured to electrically connect the terminals together. The service disconnect is removable from the receiver to disconnect the terminals from one another. Rotating the hub in a first direction drives the terminal interconnect into engagement with the terminals and rotating the hub in a second direction opposite to the first direction releases the terminal interconnect from the terminals.

In another embodiment, a service disconnect assembly is provided that includes a receiver configured to hold terminals of a power circuit and a sensor held by the receiver. The sensor is configured to communicate signals with a controller for the power circuit to allow or restrict powering of the terminals based on the communicated signals. A service disconnect is removably coupled to the receiver and holds a terminal interconnect configured to electrically connect the terminals together. The service disconnect has a handle rotatably coupled to the receiver, and the service disconnect has a trigger. The trigger is movable generally toward and away from the sensor as the handle is tightened and loosened, respectively. The sensor sends different signals to the controller based on the position of the trigger with respect to the sensor.

In a further embodiment, a service disconnect assembly is provided including a receiver configured to hold terminals of a power circuit. A service disconnect is removably coupled to the receiver. The service disconnect has a hub rotatably coupled to the receiver and a handle rotatably coupled to the receiver. The handle is rotatable with respect to the hub. The hub holds a terminal interconnect configured to electrically connect the terminals together. The service disconnect is removable from the receiver to disconnect the terminals from one another. Rotating the hub in a first direction drives the terminal interconnect into engagement with the terminals and rotating the hub in a second direction opposite to the first direction releases the terminal interconnect from the terminals. Rotating the handle in a first direction to a locked position locks the hub to the receiver and rotating the handle in a second direction to an released position allows the hub to be removed from the receiver.

BRIEF DESCRIPTION OF THE DRAWINGS

FIG. 3 is an exploded perspective view of the receiver shown in FIG. 2.

DETAILED DESCRIPTION OF THE INVENTION

Figure 1:
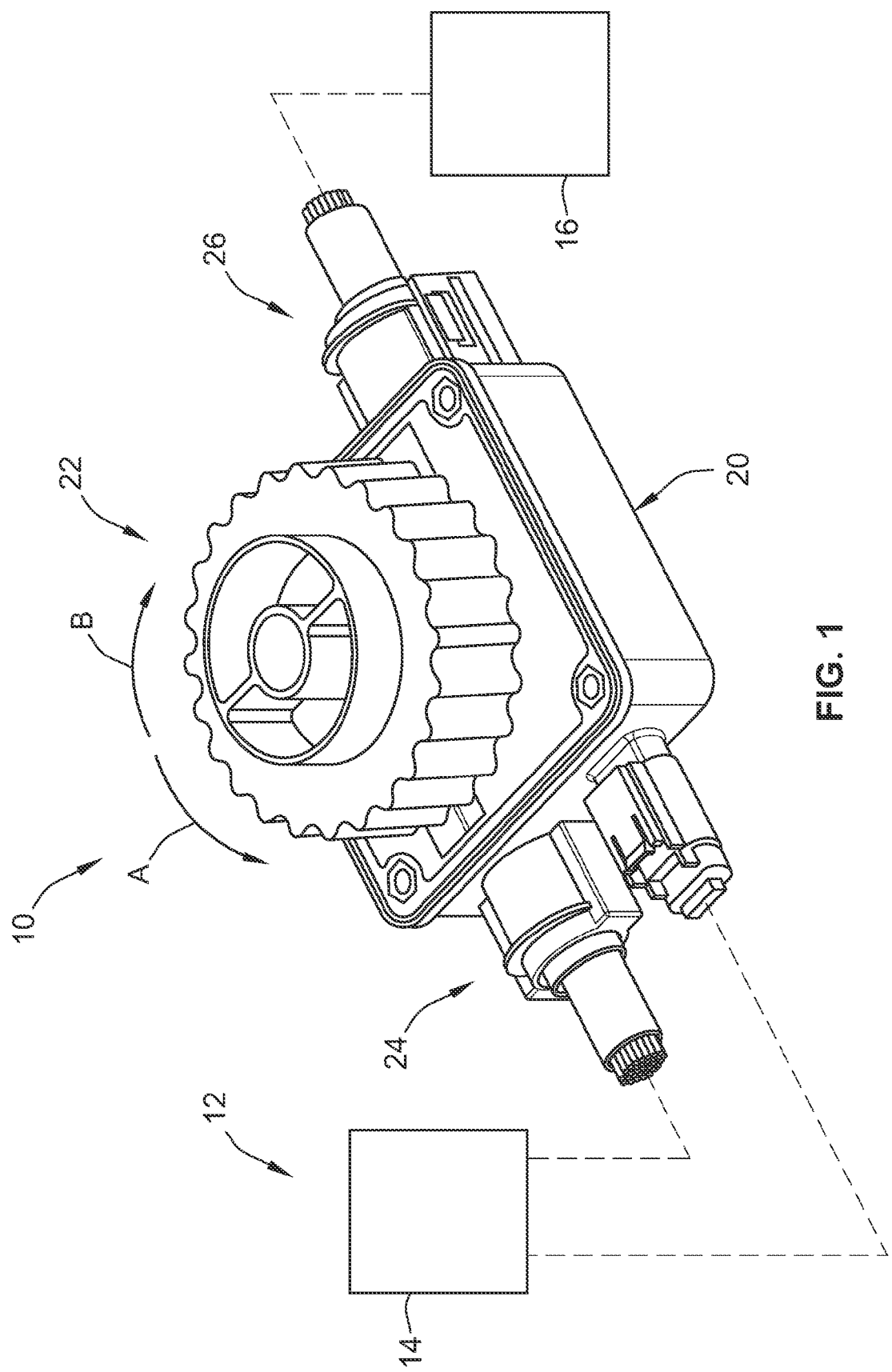
FIG. 1 is a perspective view of a service disconnect assembly in accordance with an exemplary embodiment.

FIG. 1 is a perspective view of a service disconnect assembly 10 in accordance with an exemplary embodiment. The service disconnect assembly 10 forms part of a power circuit 12, represented schematically in FIG. 1. The service disconnect assembly 10 is used to disconnect service of the power circuit 12 when opened.

In an exemplary embodiment, the power circuit 12 is a power circuit of an automotive application, such as a power supply for an alternative fuel type of vehicle. The power circuit 12 includes a power source, such as a battery pack 14, and an electronic module 16 that is powered by the power source 14. For example, the electronic module 16 may be a motor of the vehicle, such as a hybrid car, an electric car, or another type of electrically powered vehicle. In an exemplary embodiment, the power circuit 12 is a high voltage power circuit, which carries voltages higher than a 12 Volt power circuit typical of conventional gas powered vehicles.

The service disconnect assembly 10 is provided in line between the power source 14 and the electronic module 16. The service disconnect assembly 10 includes a receiver 20 and a service disconnect 22 coupled to the receiver 20. The service disconnect 22 may be removed from the receiver 20 to disconnect service or interrupt the flow path of the power circuit 12 from the power source 14 to the electronic module 16. When the service disconnect 22 is removed from the receiver 20, power is not allowed to flow from the power source 14 to the electronic module 16. For example, the service disconnect 22 is configured to electrically connect a first cable assembly 24 from the power source 14 with a second cable assembly 26 from the electronic module 16. Both cable assemblies 24, 26 extend into the receiver 20 and may be mechanically connected to the service disconnect 22 within the receiver 20. When the service disconnect 22 is removed from the receiver 20, the cable assemblies 24, 26 are not electrically connected. As such, power is unable to flow to the electronic module 16. In an exemplary embodiment, the service disconnect 22 is rotatably coupled to the receiver 20 and is tightened and loosened by rotating the service disconnect in first and second directions, respectively, shown in FIG. 1 by the arrows A and B, respectively.

Figure 2:
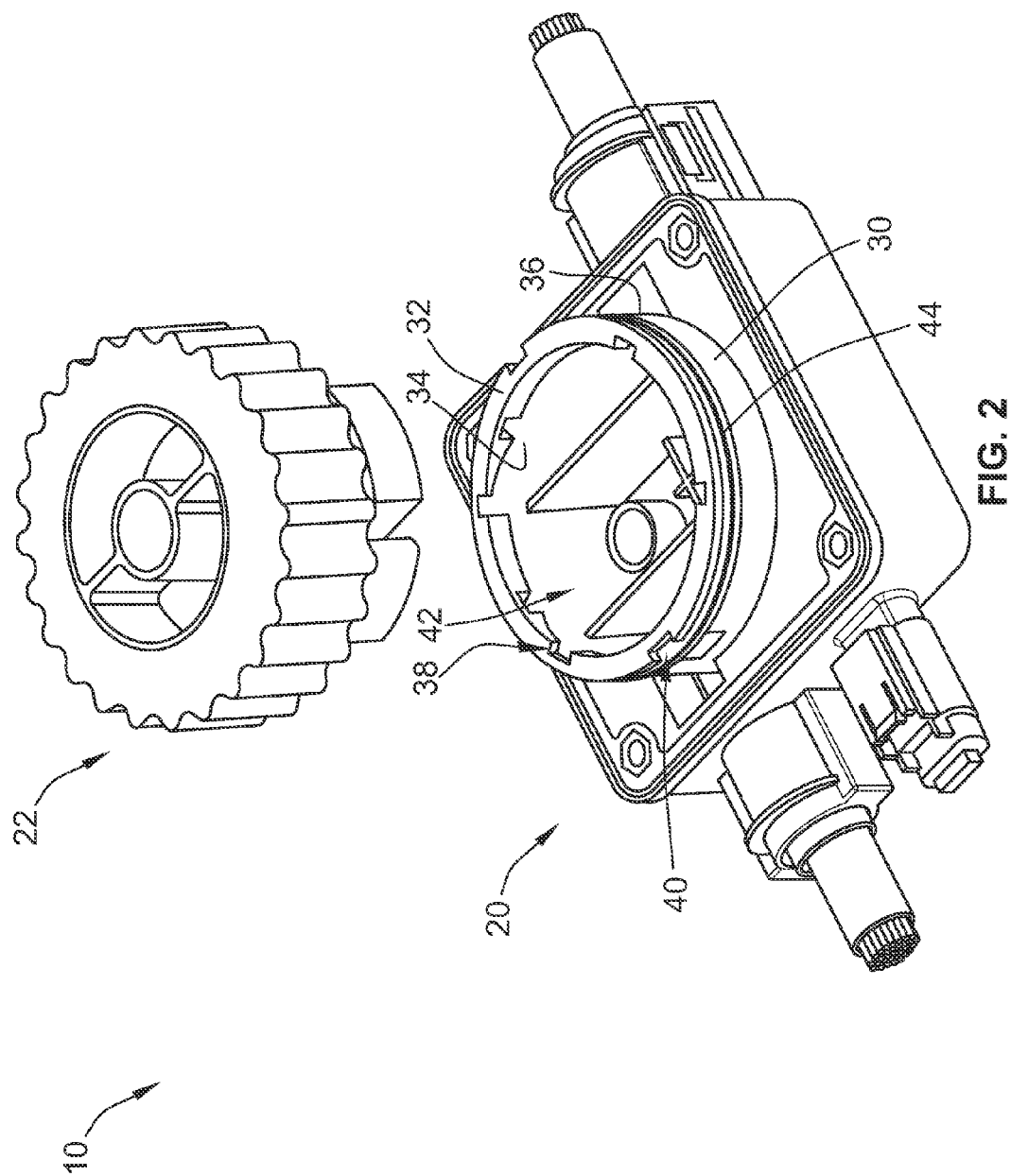
FIG. 2 illustrates the service disconnect assembly shown in FIG. 1 showing a service disconnect portion of the assembly removed from a receiver portion of the assembly.

FIG. 2 illustrates the service disconnect assembly 10 showing the service disconnect 22 removed from the receiver 20. The receiver 20 is threaded and the service disconnect 22 is threadably coupled to the receiver 20.

In an exemplary embodiment, the receiver 20 includes a rim 30 having a top edge 32 and inner and outer surfaces 34, 36 extending from the top edge 32. The rim 30 includes a plurality of inner openings 38 extending into the rim 30 from the inner surface 34 and being open at the top edge 32. The rim 30 includes a plurality of outer openings 40 extending into the rim 30 from the outer surface 36 and being open at the top edge 32. Any number of inner openings 38 and outer openings 40 may be provided, and the inner and outer openings 38, 40 may be oriented at any location along the rim 30. The receiver 20 includes a cavity 42 defined, at least in part, by the rim 30. The cavity 42 has an open top. The receiver 20 includes threads 44 on the outer surface 36 of the rim 30. The service disconnect 22 is threadably coupled to the receiver 20 using the threads 44.

The service disconnect 22 is received within the cavity 42 through the open top. The service disconnect 22 includes keying features, such as projections, that extend into the inner and outer openings 38, 40 to orient the service disconnect 22 with respect to the receiver 20 when the service disconnect 22 is coupled to the receiver 20. The service disconnect 22 may be fully loaded into the cavity 42 after the keying features are aligned with the inner and outer openings 38, 40.

FIG. 3 is an exploded perspective view of the receiver 20. The receiver 20 includes a housing 50 and an insert 52 received in the housing 50. In the illustrated embodiment, the housing 50 and insert 52 are box shaped, however, the housing 50 and insert 52 may have other shapes in alternative embodiments. While the housing 50 and insert 52 are separate components in the illustrated embodiment, it is realized that the receiver 20 may include a single element that defines the housing 50 and insert 52. In such embodiment, the insert 52 may be integrally formed with the housing 50.

The housing 50 includes a closed bottom 54 and an open top 56. Sidewalls 58 extend between the bottom 54 and the top 56. The bottom 54 and sidewalls 58 define a cavity 60 that receives the insert 52. The sidewalls 58 may have substantially equal lengths, or the sidewalls 58 may have different lengths. Any number of sidewalls 58 may be provided.

A pair of bosses 62 extend from two opposed sidewalls 58. The bosses 62 are hollow and receive the first and second cable assemblies 24, 26. Any number of bosses 62 may be provided for receiving any number of cable assemblies. The bosses 62 may be positioned anywhere along the sidewalls 58, depending on the particular configuration of the other components of the receiver 20. In the illustrated embodiment, the bosses 62 extend along parallel axes that are offset from one another. The bosses 62 include barbs 64 extending outward therefrom. The barbs 64 are configured to hold the cable assemblies 24, 26 with respect to the housing 50.

The housing 50 also includes a connector boss 66 extending from one of the sidewalls 58. The connector boss 66 includes a connector port 68 therethrough that is open through the connector boss 66 to the cavity 60.

The insert 52 includes a block 69 that is received within the cavity 60 of the housing 50. The rim 30 extends from a top of the block 69. Terminal channels 70 extend through the block 69 and are open along the sides of the block 69. The terminal channels 70 are aligned with the bosses 62 when the insert 52 is received in the cavity 60. In an exemplary embodiment, two terminal channels 70 are provided that extend parallel to one another. The terminal channels 70 are separated from one another by the block 69. A port 72 is associated with each terminal channel 70 and the port 72 provides access to the respective terminal channel 70. The ports 72 are open within the cavity 42 and thus provide access to the terminal channels 70 from the cavity 42.

In an exemplary embodiment, a high-voltage interlock (HVIL) system 74 is provided. The HVIL system 74 includes a pair of HVIL sensors 76, an internal electrical connector 78 coupled to the HVIL sensors 76, and an external mating connector 80 configured to be coupled to the connector 78. The HVIL system 74 allows and restricts high-voltage power from flowing through the power circuit 12 (shown in FIG. 1). For example, the HVIL system 74 is operable in ON and OFF states. In the ON state, high-voltage power is allowed to flow through the power circuit 12. In the OFF state, high-voltage power is restricted from flowing through the power circuit 12. The HVIL system 74 is configured to be coupled to a controller 82, which is schematically illustrated in FIG. 3. The controller 82 may form part of the power circuit 12, or may be coupled to a controller associated with the power circuit 12, and may control the flow of power from the power source 14. The mating connector 80 may be coupled to the controller 82 by a cable. Wires 84 interconnect the electrical connector 78 and the HVIL sensors 76. The electrical connector 78 is received within the connector port 68. The mating connector 80 is coupled to the connector boss 66 for mating with the electrical connector 78. The HVIL sensors 76 are held by the housing 50 and/or the insert 52, such as within pockets or by using fasteners or clips. The HVIL sensors 76 communicate signals with the controller 82. For example, the HVIL sensors 76 sense when the service disconnect 22 (shown in FIG. 1) is mated with the receiver 20, and the HVIL sensors 76 sense when the service disconnect 22 is unmated from the receiver 20. The HVIL sensors 76 send different signals to the controller 82 based on the mated condition of the service disconnect 22.

Each cable assembly 24, 26 includes a terminal 86 mounted to an end of a cable 88. A cap 90 is provided to secure the cable assembly 24, 26 to the corresponding boss 62. The barbs 64 secure the caps 90 to the bosses 62. A grommet 92 is provided to seal between the cable 88 and the boss 62. During assembly, after the insert 52 is loaded into the cavity 60, the terminals 86 are loaded through the bosses 62 into the terminal channels 70. In an exemplary embodiment, fingers 94 hold the terminal 86 in place within the housing 50 and the insert 52. When the terminals 86 are loaded into the insert 52, holes 96 at the end of the terminals 86 are aligned with the ports 72 of the insert 52. The terminals 86 are physically spaced apart from one another by the insert 52 such that the terminals 86 are not directly electrically connected to one another. The removable service disconnect 22 is used to electrically connect the terminals 86 together.

Figure 4A:
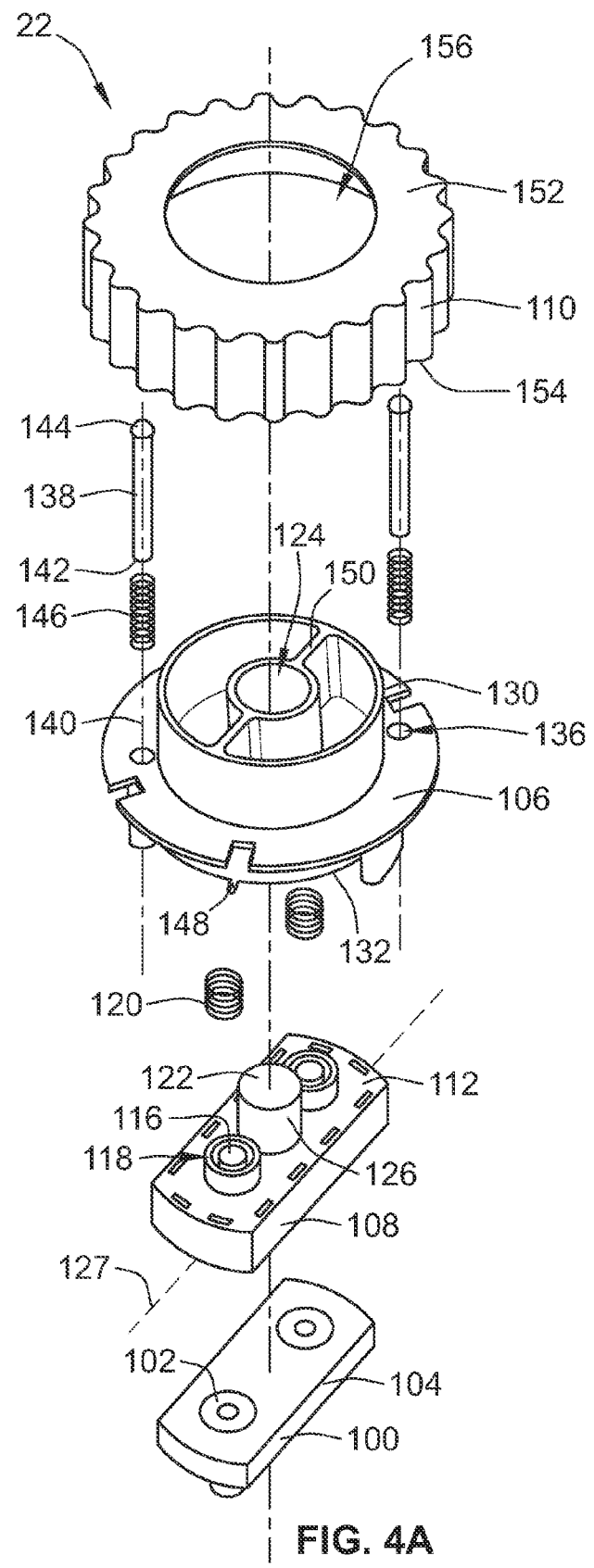
FIG. 4A is an exploded top perspective view of the service disconnect shown in FIG. 2.
Figure 4B:
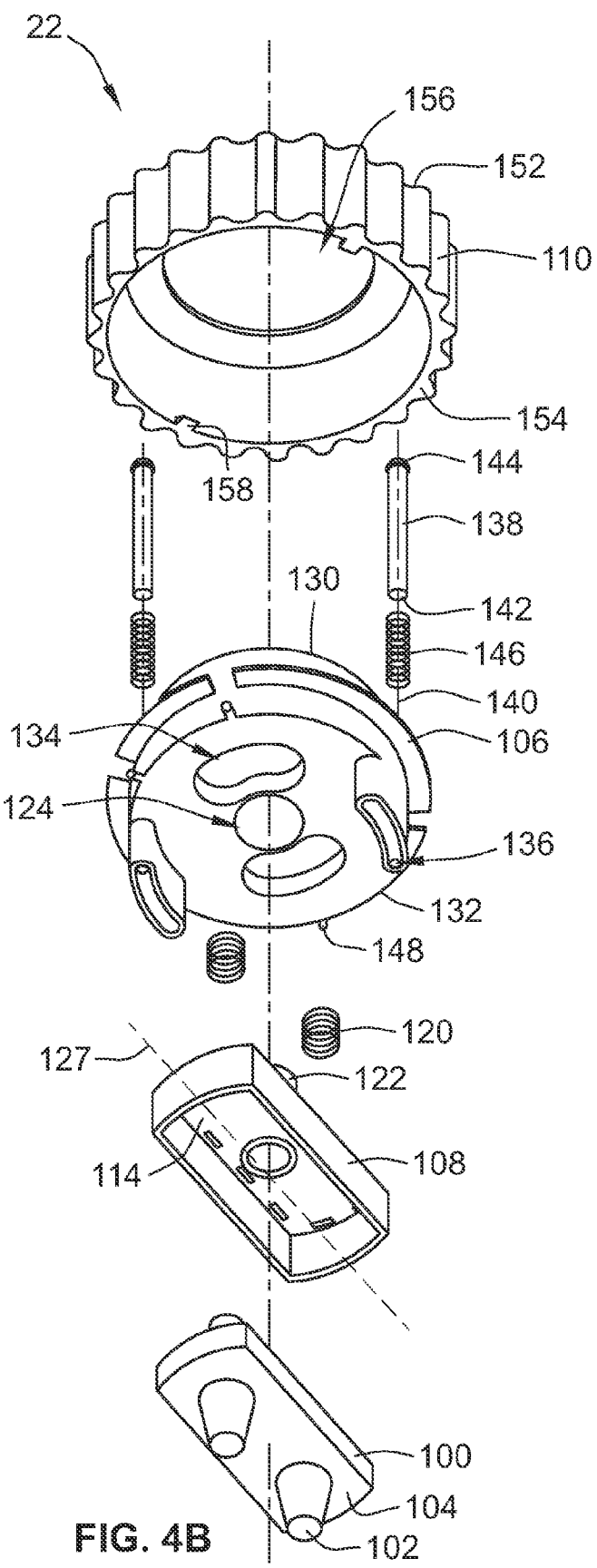
FIG. 4B is an exploded bottom perspective view of the service disconnect shown in FIG. 2.

FIGS. 4A and 4B are exploded top and bottom perspective views, respectively, of the service disconnect 22. The service disconnect 22 is configured to hold a terminal interconnect 100. The terminal interconnect 100 provides a mechanical and electrical link between the terminals 86 (shown in FIG. 3) to create an electrical path between the terminals 86 and complete the current flow through the service disconnect.

In an exemplary embodiment, the terminal interconnect 100 includes a pair of pins 102 that are configured to be received within the holes 96 (shown in FIG. 3) of the terminals 86. The terminal interconnect 100 also includes a bar 104 connecting the pins 102. The bar 104 operates to hold the pins 102 in position relative to one another. The bar 104 also operates to define an electrical path between the pins 102. In an exemplary embodiment, the bar 104 may be fabricated from a conductive material such as a brass material, a copper material, and the like. Optionally, the bar 104 may also operates as a heat sink configured to dissipate heat generated by the pins 102. The bar 104 may be sized and shaped to accommodate such heat dissipation. The bar 104 may be fabricated from a material selected to help dissipate heat.

The service disconnect 22 includes a hub 106, a holder 108 that holds the terminal interconnect 100, and a handle 110 that secures the hub 106 to the receiver 20 (shown in FIG. 3). The hub 106 and the handle 110 are both circular in shape and are rotated to be tightened and loosened from the receiver 20. In an exemplary embodiment, the hub 106 and the handle 110 are discrete separate components that may be rotated relative to one another. Alternatively, the hub 106 and handle 110 may be integrally formed as a single piece. The hub 106 and the handle 110 also rotate relative to the holder 108.

The holder 108 includes a top 112 and a bottom 114. The terminal interconnect 100 is received in the bottom 114 of the holder 108. A pair of fingers 116 extend from the top of the holder 108. The fingers 116 have channels 118 that receive bias springs 120 therein. A post 122 extends from a center of the top 112. The post 122 is received within a central bore 124 of the hub 106. Optionally, the post 122 may include latches 126 that secure the post 122 within the central bore 124. The post 122 and central bore 124 are circular to allow the hub 106 to rotate with respect to the holder 108. The holder 108 is elongated along a longitudinal axis 127. The fingers 116 are offset on opposite sides of the post 122 along the longitudinal axis 127 and are generally aligned with the pins 102 when the terminal interconnect 100 is loaded into the holder 108.

The hub 106 includes a top 130 and a bottom 132. The holder 108 is coupled to the bottom 132 of the hub 106. Slots 134 are formed in the bottom 132 that receive the fingers 116. In the illustrated embodiment, the slots 134 have an arcuate shape to accommodate relative movement of the hub 106 with respect to the holder 108 and the fingers 116. For example, as the hub 106 is rotated, each finger 116 slides from one end of the corresponding arcuate slot 134 to the other end of the arcuate slot 134.

The hub 106 includes a pair of openings 136 that receive HVIL triggers 138 therein. The openings 136 extend axially along the hub 106 and are open at the top 130 and the bottom 132. The HVIL triggers 138 form part of the HVIL system 74 (shown in FIG. 3). As described in further detail below, the HVIL sensors 74 (shown FIG. 3) detect the presence of the HVIL triggers 138 when the service disconnect 22 is coupled to the receiver 20. For example, the hub 106 positions the HVIL triggers 138 with respect to the HVIL sensors 76 and the handle 110 is tightened to drive the HVIL triggers 138 toward the HVIL sensors 76 so that the HVIL sensors 76 can detect the presence of the HVIL triggers 138. The HVIL triggers 138 extend along a trigger axis 140 between a trigger end 142 and a handle end 144. The trigger end 142 generally faces the HVIL sensor 76 and the handle end 144 generally faces the handle 110. Bias springs 146 surround the HVIL triggers 138 and force the HVIL triggers 138 generally away from the HVIL sensor 76 and toward the handle 110. As the handle 110 is tightened to the receiver 20, the HVIL triggers 138 are brought into proximity with the HVIL sensors 76.

The hub 106 includes a plurality of projections 148 extending radially outward therefrom. Optionally, the projections 148 may be positioned proximate to the bottom 132. In the illustrated embodiment, the projections 148 constitute cylindrical pegs, however the projections 148 may have any shape. For example, in an alternative embodiment, the projections 148 are elongated and extend at least partially circumferentially along the outer edge of the hub 106. The projections 148 may constitute ramps wherein at least one of the surfaces of the projections 148 are nonparallel to, and oriented at an angle with respect to, the bottom 132. The projections 148 are configured to engage a portion of the receiver 20 to secure the hub 106 to the receiver 20. For example, the hub 106 may be rotated and the projections 148 may engage a portion of the receiver 20 when the hub 106 is rotated.

In an exemplary embodiment, the top 130 of the hub 106 includes a finger grip 150 configured to be gripped by a person's finger to tighten and untighten the hub 106 to the receiver 20. In the illustrated embodiment, the finger grip 150 constitutes an axially extending wall. The user is able to position a thumb on one side of the wall and another finger on the opposite side of the wall to twist the hub 106 in a tightening direction or a loosening direction. Other types of finger grips 150 may be used in alternative embodiments. The finger grip 150 allows for toolless actuation of the hub 106.

The handle 110 includes a top 152 and a bottom 154. The top 152 includes an opening 156. Additionally, the bottom 154 is open. Optionally, the radially outer surface of the handle 110 may define a handgrip to make it easy for the user to tighten and untighten the handle 110. The handgrip allows the user to tighten and untighten the handle 110 without the use of a tool. The handle 110 includes a plurality of projections 158 extending radially inward therefrom. Optionally, the projections 158 may be positioned proximate to the bottom 154. In the illustrated embodiment, the projections 158 constitute triangular shaped ramps, however the projections 158 may have any shape. In an alternative embodiment, the projections 158 are elongated and define threads extending at least partially circumferentially along the inner edge of the handle 110. The projections 158 are configured to engage threads 44 (shown in FIG. 2) to threadably coupled the handle 110 to the receiver 20.

Figure 5:
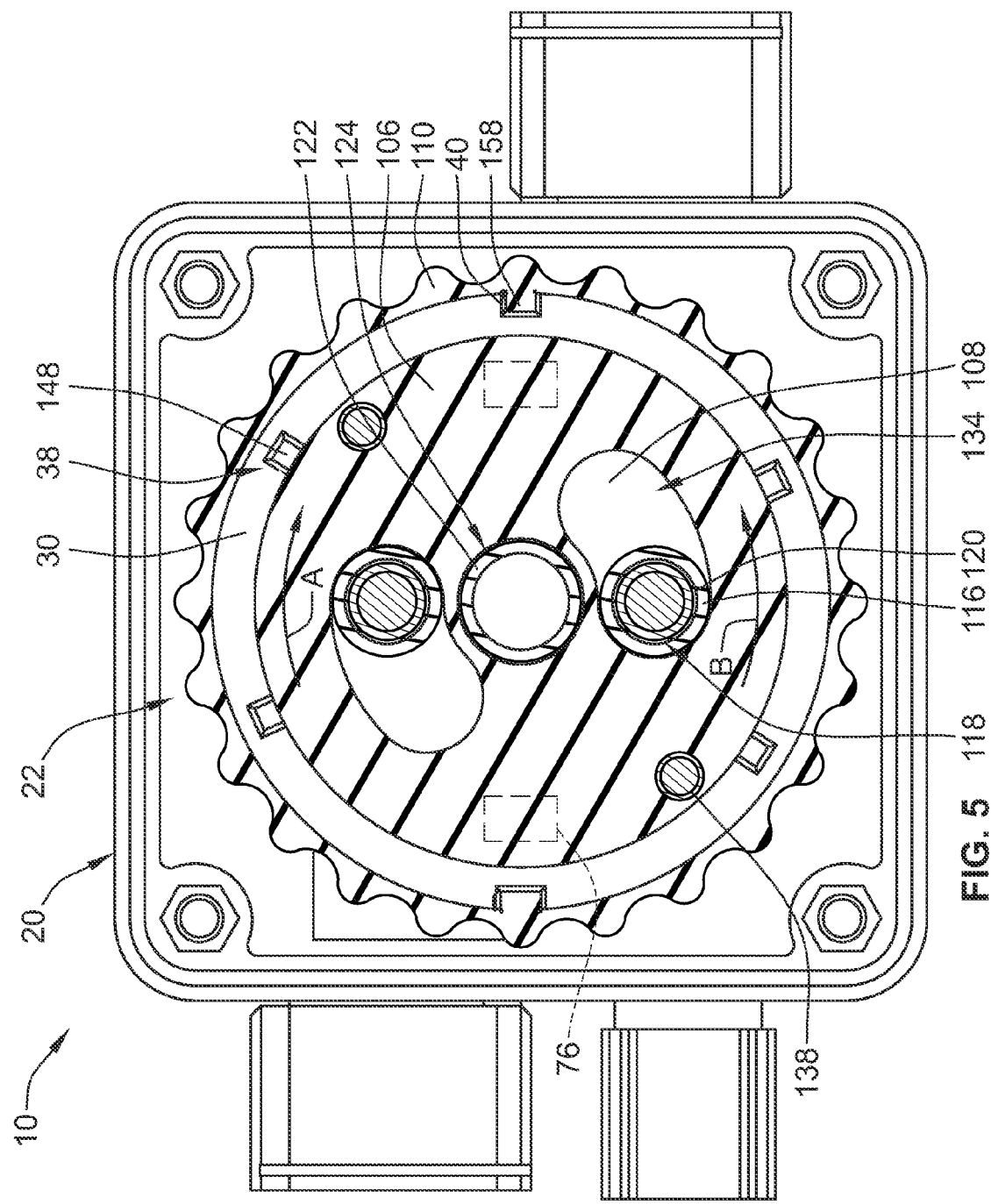
FIG. 5 is a top sectional view of the service disconnect assembly shown in FIG. 1 in an initial position.

FIG. 5 is a top sectional view of the service disconnect assembly 10 in an initial position. In the first stage of assembly, the service disconnect 22 is aligned with the receiver 20 such that the projections 148 of the hub 106 are aligned with the inner opening 38 of the rim 30 and such that the projections 158 of the handle 110 are aligned with the outer openings 40 of the rim 30.

During assembly, the hub 106 is initially coupled to the receiver 20 by rotating the hub 106 in the first direction, shown by arrow A, to a final position. Optionally, the hub 106 may be locked in the final position. After the hub 106 is in the final position, the handle 110 is coupled to the receiver by rotating the handle 110 in the first direction, shown by arrow A, to a final position. Optionally, the handle 110 may be locked in the final position. To remove the service disconnect 22 from the receiver 20, the hub 106 is first loosened by rotating in the second direction, shown by arrow B. The handle 110 is then loosened by rotating in the second direction. The hub 106 is loosened first so that the HVIL triggers 138 are moved away from the HVIL sensors 76. As such, the high voltage power is shut down. While the handle 110 is being loosened, time passes, which allows the high voltage to dissipate, such that when the handle 110 is fully loosened, the service disconnect 22 may be removed without the risk of arcing. In an alternative embodiment, the handle 110 is first loosened, followed by loosening of the hub 106. As the handle 110 is loosened, the HVIL triggers 138 are elevated away from the HVIL sensors 76, and the initial loosening of the handle 110 will switch the operating state of the HVIL sensors 76 to the OFF state. Continued loosening of the handle 110 and loosening of the hub 106 takes time, which allows the high voltage to dissipate, making it safe to remove the service disconnect 22 from the receiver 20. Optionally, the handle 110 may be tightened and loosened by rotating the handle 110 in opposite directions as the hub 106. The tightening and loosening of the hub 106 and the handle 110 may be accomplished by hand, and without the need for separate tools.

In the initial position, the fingers 116 of the holder 108 are received in the articulate slots 134. The channels 118 of the fingers 116 hold the bias springs 120 therein. The post 122 extends from the holder 108 and is received within the central bore 124 of the hub 106. The hub 106 is configured to be rotated from the initial position in the first direction, while the holder 108 remains stationary. The hub 106 may be rotated by predetermined amount. For example, in the illustrated embodiment, the hub 106 may be rotated approximately 45°. Because the holder 108 remain stationary with respect to the receiver 20 as the hub 106 is rotated, each finger 116 slides from one end of the corresponding arcuate slot 134 to the other end of the arcuate slot 134 as the hub 106 is rotated.

In the initial position, the HVIL triggers 138 are not aligned with the HVIL sensors 76 (shown in phantom in FIG. 5). For example, the HVIL triggers 138 are angularly offset by a predetermined amount. In the illustrated embodiment, the HVIL triggers 138 are angularly offset by approximately 45°. As the hub 106 is rotated, the HVIL triggers 138 are rotated with the hub 106 to be in alignment with the HVIL sensors 76.

Figure 6:
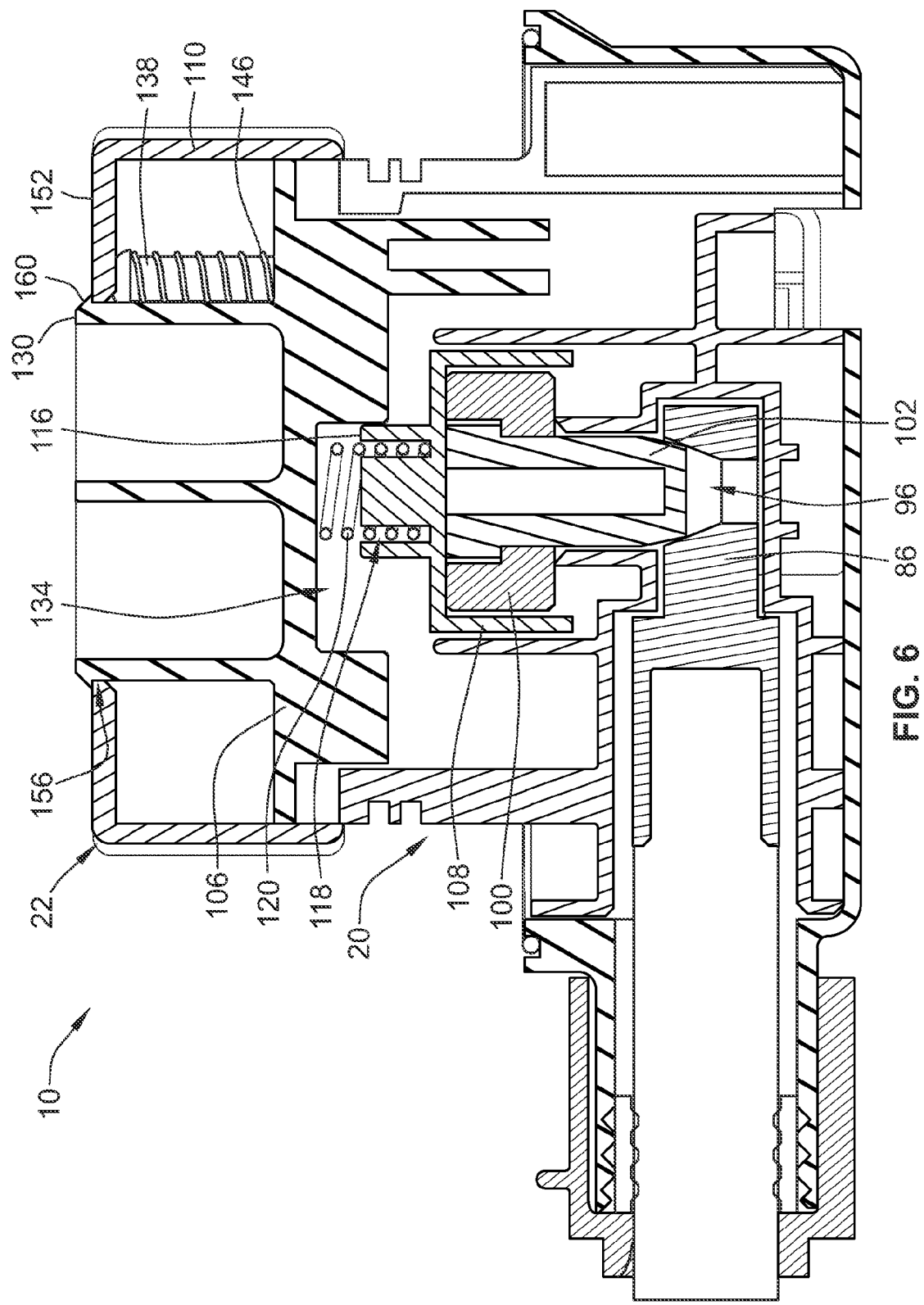
FIG. 6 is a side cross-sectional view of the service disconnect assembly in an initial position.

FIG. 6 is a side cross-sectional view of the service disconnect assembly 10 in the initial position. In the first stage, the service disconnect 22 is loaded into the receiver 20 such that the pins 102 are aligned with and received within the holes 96 of the terminals 86. The channels 118 of the fingers 116 hold the bias springs 120 therein between the hub 106 and the holder 108. The springs 120 forced the holder 108, and the terminals interconnect 100 held by the holder 108, downward towards the terminals 86. The top of the slot 134 is spaced apart from the top of the finger 116 to allow vertical movement of the hub 106 toward the holder 108 as the hub 106 is rotated from the initial position.

In the first stage, the top 152 of the handle 110 is held at the top 130 of the hub 106. The top 130 extends through the opening 156. A latch 160 is provided at the top 130 of the hub 106. The latch 160 may extend circumferentially around the top 130. The latch 160 holds the handle 110 on the hub 106. In an exemplary embodiment, the handle 110 is forced against the latch 160 by the HVIL triggers 138. For example, the bias springs 146 may force the HVIL triggers 138 against the handle 110, forcing the handle upward.

Figure 7:
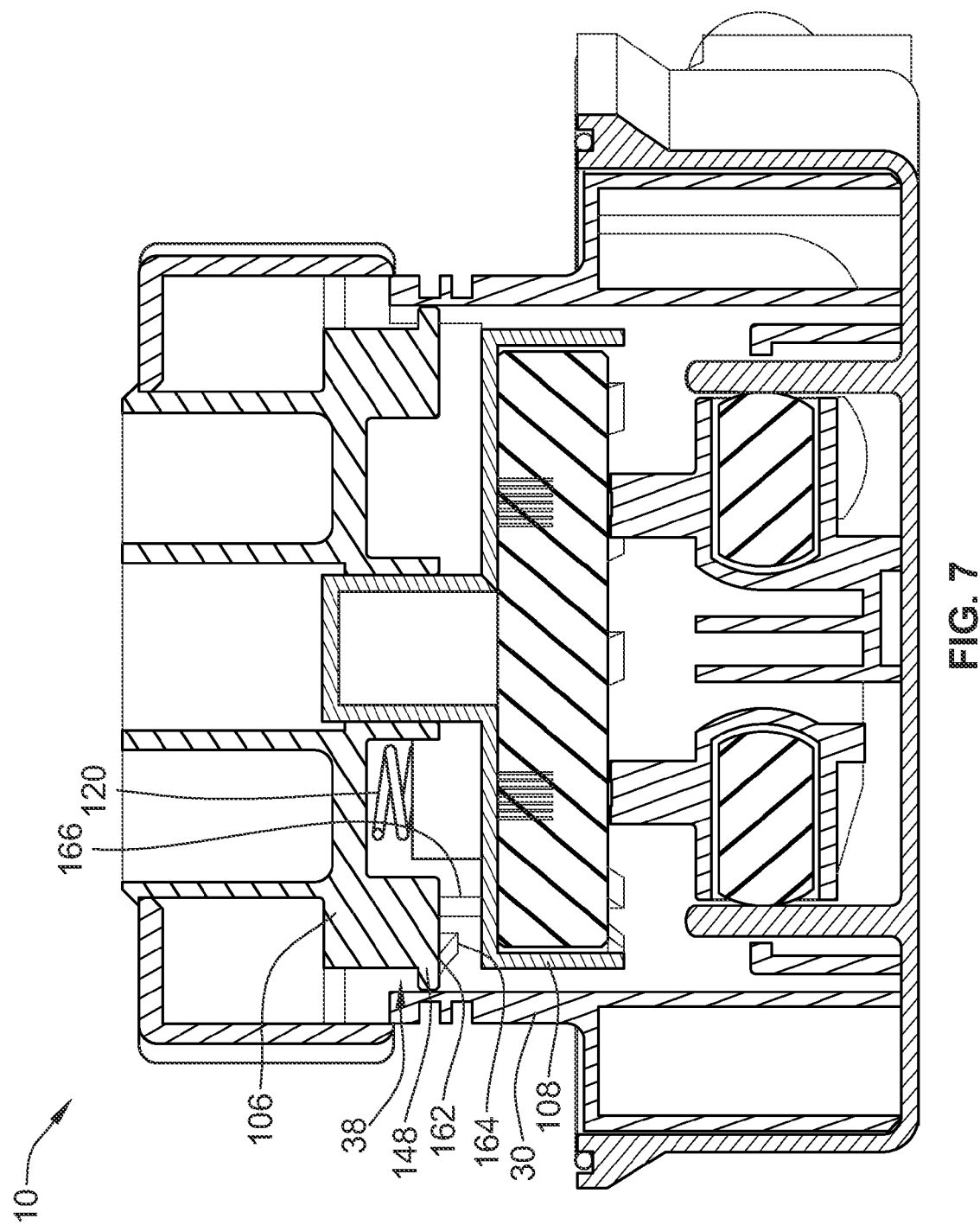
FIG. 7 is another side cross-sectional view of the service disconnect assembly in an initial position.

FIG. 7 is another side cross-sectional view of the service disconnect assembly 10 in the initial position illustrating the projection 148 of the hub 106 loaded through the inner opening 38 of the rim 30. Tangential to the inner opening 38 is an inwardly extending ramp 162. While only one ramp 162 is illustrated, any number of ramps 162 may be provided. The ramp 162 is angled downward from the inner openings 38 to a distal end 164 of the ramp 162. As the hub 106 is rotated in the first direction, the projection 148 engages and slides along the ramp 162. The ramp 162 forces the hub 106 downward toward the holder 108. As the hub 106 is forced downward, the springs 120 are compressed providing a greater spring force on the holder 108.

A stop wall 166 is provided proximate to the distal end 164. Optionally, the stop wall 166 may be spaced from the distal end 164 by a distance greater than the width of the projection 148. The hub 106 is rotated until the projection 148 engages the stop wall 166. When the projection 148 engages the stop wall 166, the projection 148 is no longer aligned with the ramp 162, and instead is captured between the stop wall 166 and the distal end 164 of the ramp 162. The springs 120 may force the hub 106 upward into the space created between the distal end 164 and the stop wall 166. As such, the projection 148 may be locked between the stop wall 166 and the ramp 162. Removal of the hub 106 requires the hub 106 to be pushed downward until the projection 148 clears the bottom of the ramp 162, such that the projection 148 may ride upward along the ramp 162.

Figure 8:
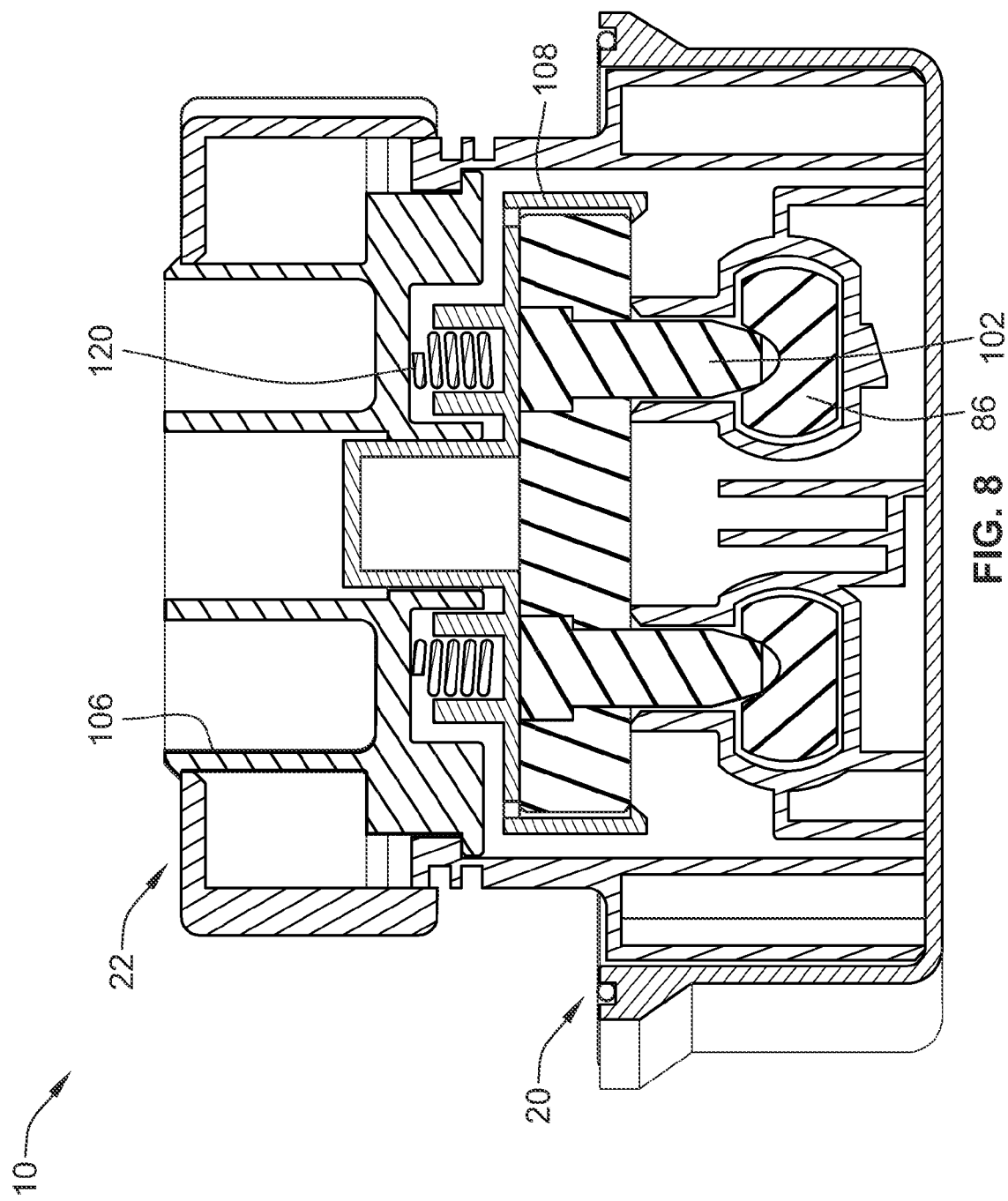
FIG. 8 is a side cross-sectional view of the service disconnect assembly with the service disconnect partially mated with the receiver.

FIG. 8 is a side cross-sectional view of the service disconnect assembly 10 at a second stage of assembly with the service disconnect 22 partially mated with the receiver 20. In the second stage of assembly, the hub 106 has been rotated in the first direction to the final and/or locked position. The springs 120 have been compressed between the hub 106 and the holder 108. The springs 120 and the hub 106 force the holder 108 downward, which insures electrical contact of the pins 102 with the terminals 86.

Figure 9:
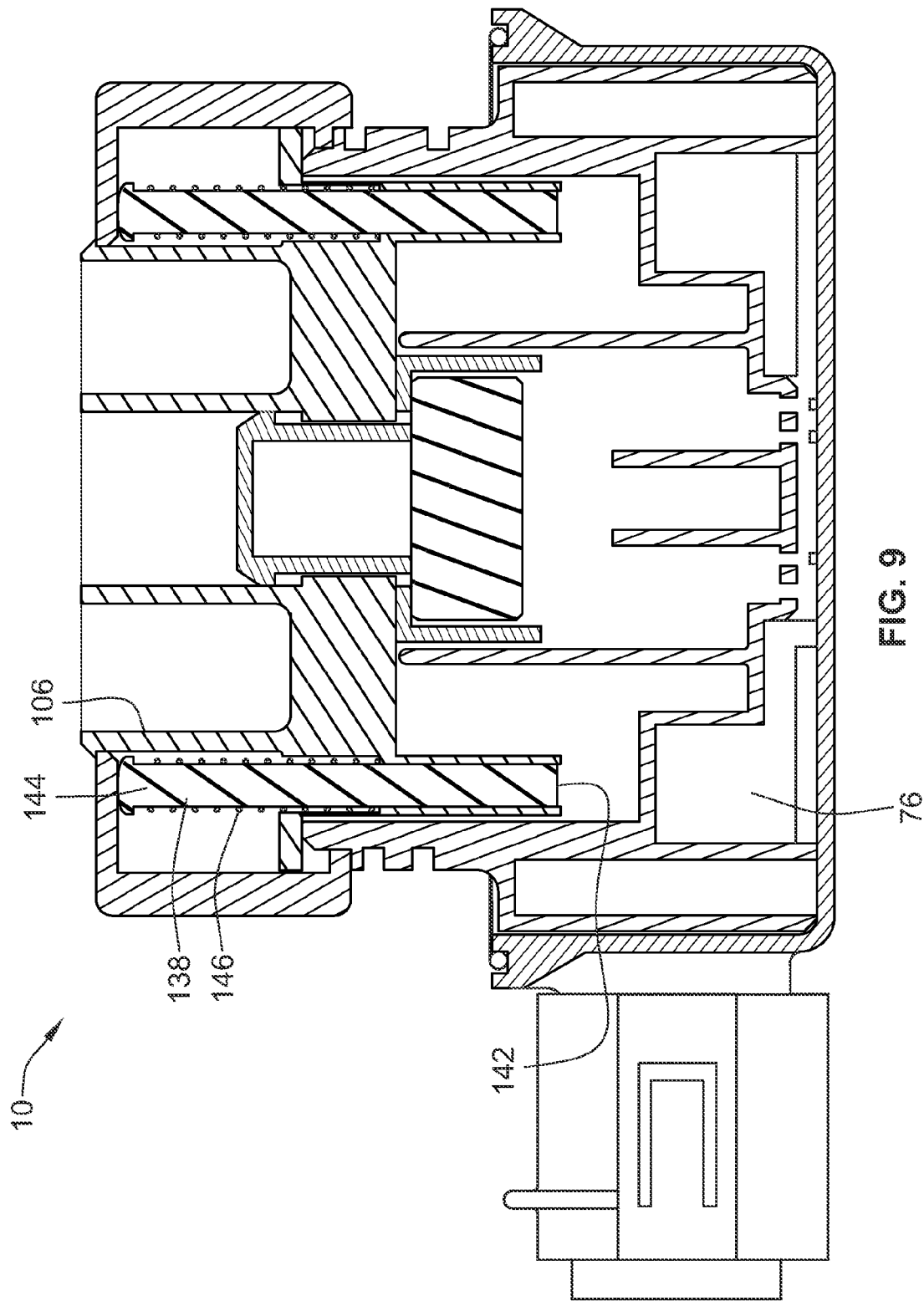
FIG. 9 is a different cross-sectional view of the service disconnect assembly with the service disconnect in the same mated position with the receiver as in FIG. 8.

FIG. 9 is a different cross-sectional view of the service disconnect assembly 10 in the second stage of assembly. After the hub 106 is rotated in the first direction to the locked position, the HVIL triggers 138 are aligned with the HVIL sensors 76. The bias springs 146 force the handle ends 144 upward such that the trigger ends 142 are held away from the HVIL sensors 76. In the second stage of assembly, with the HVIL triggers 138 held away from the HVIL sensors 76, the HVIL sensors 76 remain in an OFF state. As such, high-voltage power is restricted from flowing through the power circuit 12 (shown in FIG. 1). Until the HVIL triggers 138 are brought into close proximity to the HVIL sensors 76, the HVIL sensors 76 remain in the OFF state.

Figure 10:
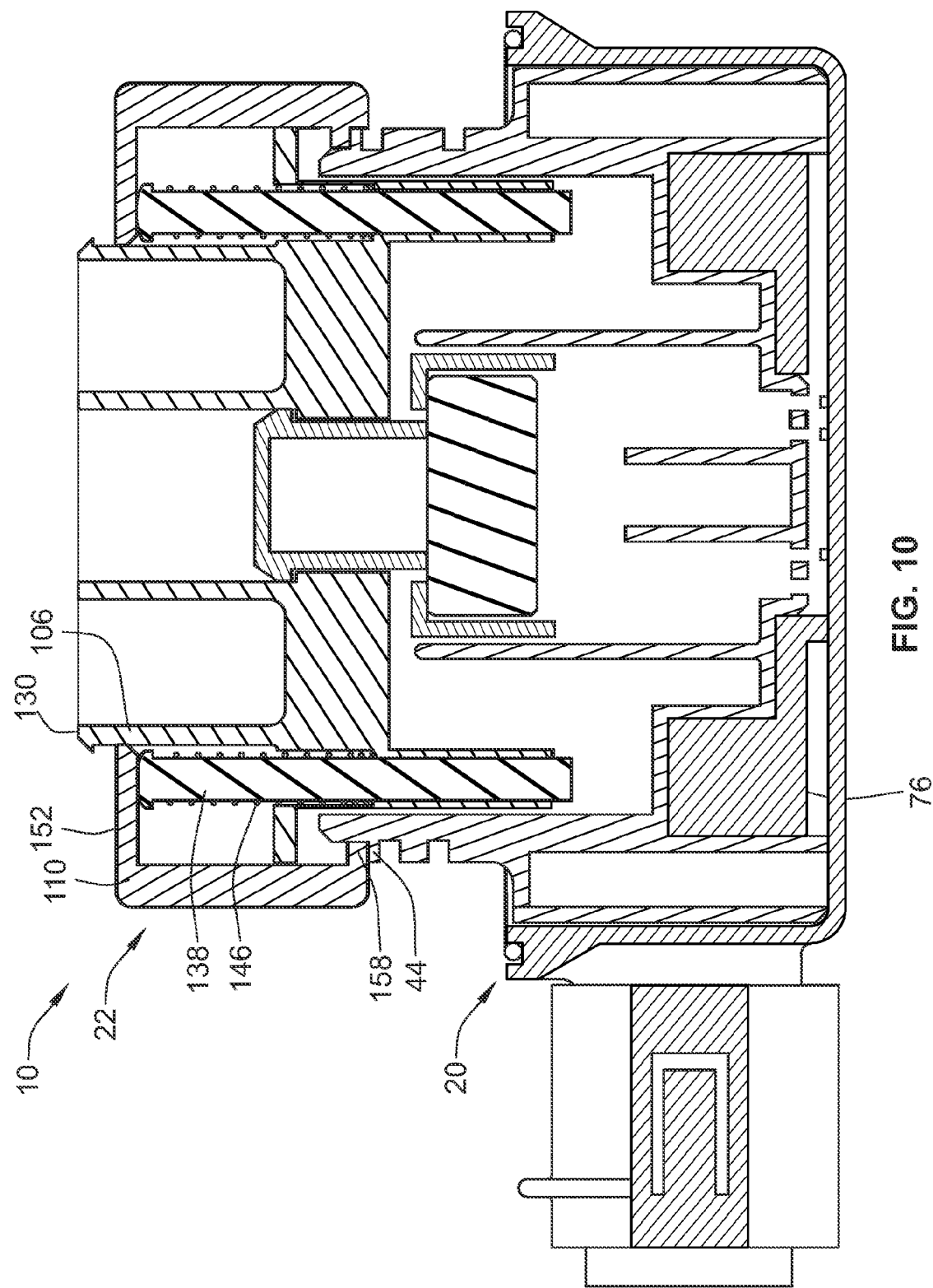
FIG. 10 is another cross-sectional view of the service disconnect assembly with the service disconnect further mated with the receiver.

FIG. 10 is another cross-sectional view of the service disconnect assembly 10 in a third stage of assembly with the service disconnect 22 further mated with the receiver 20. In the third stage of assembly, the handle 110 is pushed downward until the projections 158 engage the threads 44. The handle 110 may then be rotated in the first direction to tighten the handle 110 to the receiver 20. In one embodiment, the handle 110 is rotated more than 360°. Optionally, the handle 110 may be rotated approximately 90°. When the handle 110 is pushed downward, the top 152 of the handle 110 is recessed below the top 130 of the hub 106. As the handle 110 is pushed downward, the HVIL triggers 138 are simultaneously pushed downward toward the HVIL sensors 76. The bias springs 146 are compressed as the handle 110 is pushed downward. Similarly, as the handle 110 is tightened, the handle 110 is threaded downward and the HVIL triggers 138 are simultaneously pushed downward toward the HVIL sensors 76.

Figure 11:
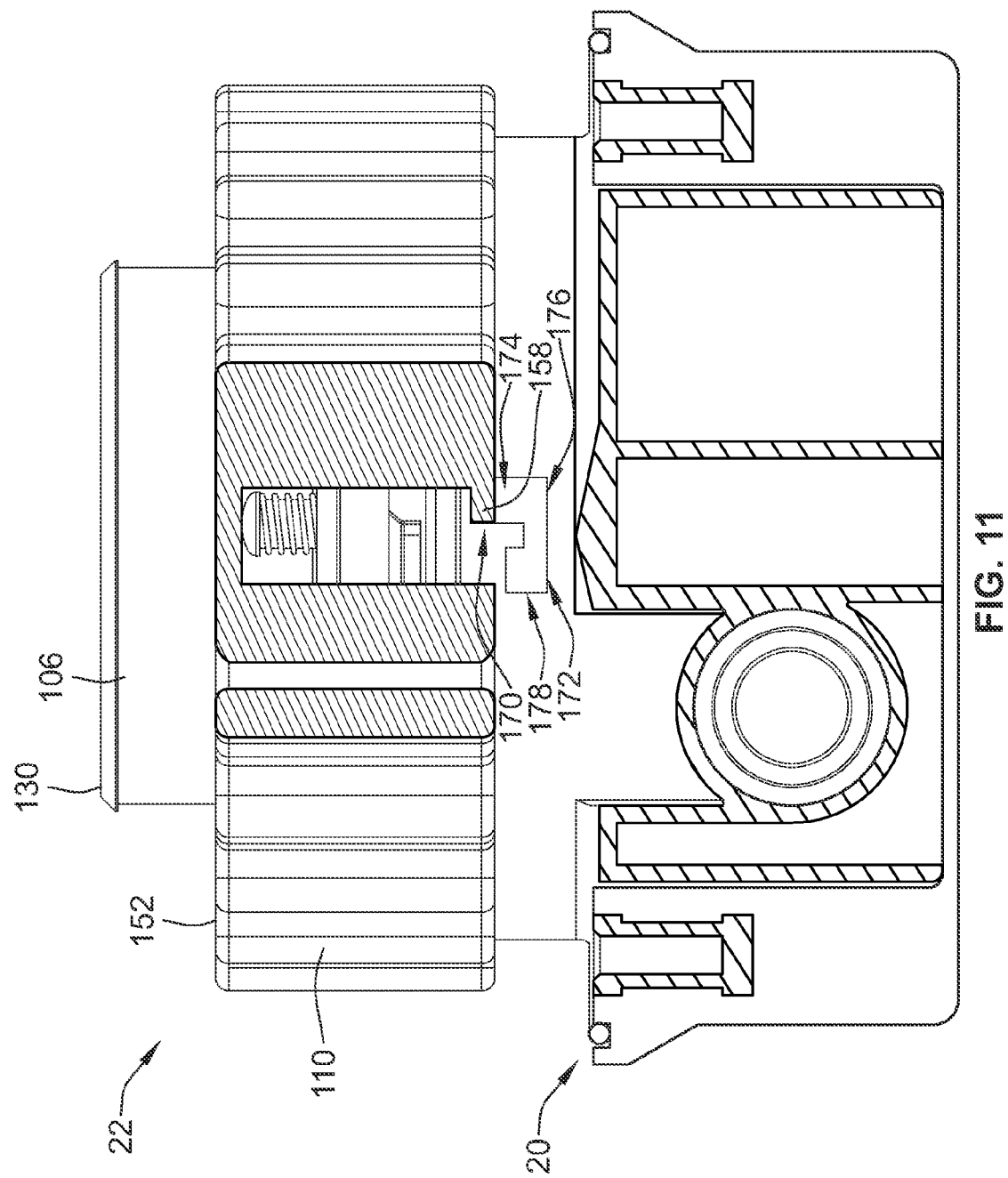
FIG. 11 is a partial sectional view of the service disconnect during mating with the receiver.

FIG. 11 is a partial sectional view of the service disconnect 22 during mating with the receiver 20 in a fourth stage of assembly. The service disconnect 22 is moved from the third stage of assembly to the fourth stage of assembly by rotating the handle 110 in the first direction. The top 152 of the handle 110 is recessed below the top 130 of the hub 106.

In the fourth stage of assembly, the projection 158 engages a stop wall 170 of the receiver 20. Further tightening of the handle 110 is restricted by the stop wall 170. A locking channel 172 is defined below the stop wall 170. The handle 110 may be locked to the receiver 20 by moving the projection 158 into the locking channel 172. For example, the handle 110 may be pushed downward, rotated further in the first direction, and then released. The projection 158 travels through a first portion 174 of the locking channel 172 when the handle is pushed downward. The projection 158 travels along a second portion 176 of the locking channel 172 when the handle 110 is rotated further in the first direction. The projection 158 travels along a third portion 178 of the locking channel 172 when the handle 110 is released to a locked position, such as the position illustrated in FIG. 12.

Figure 12:
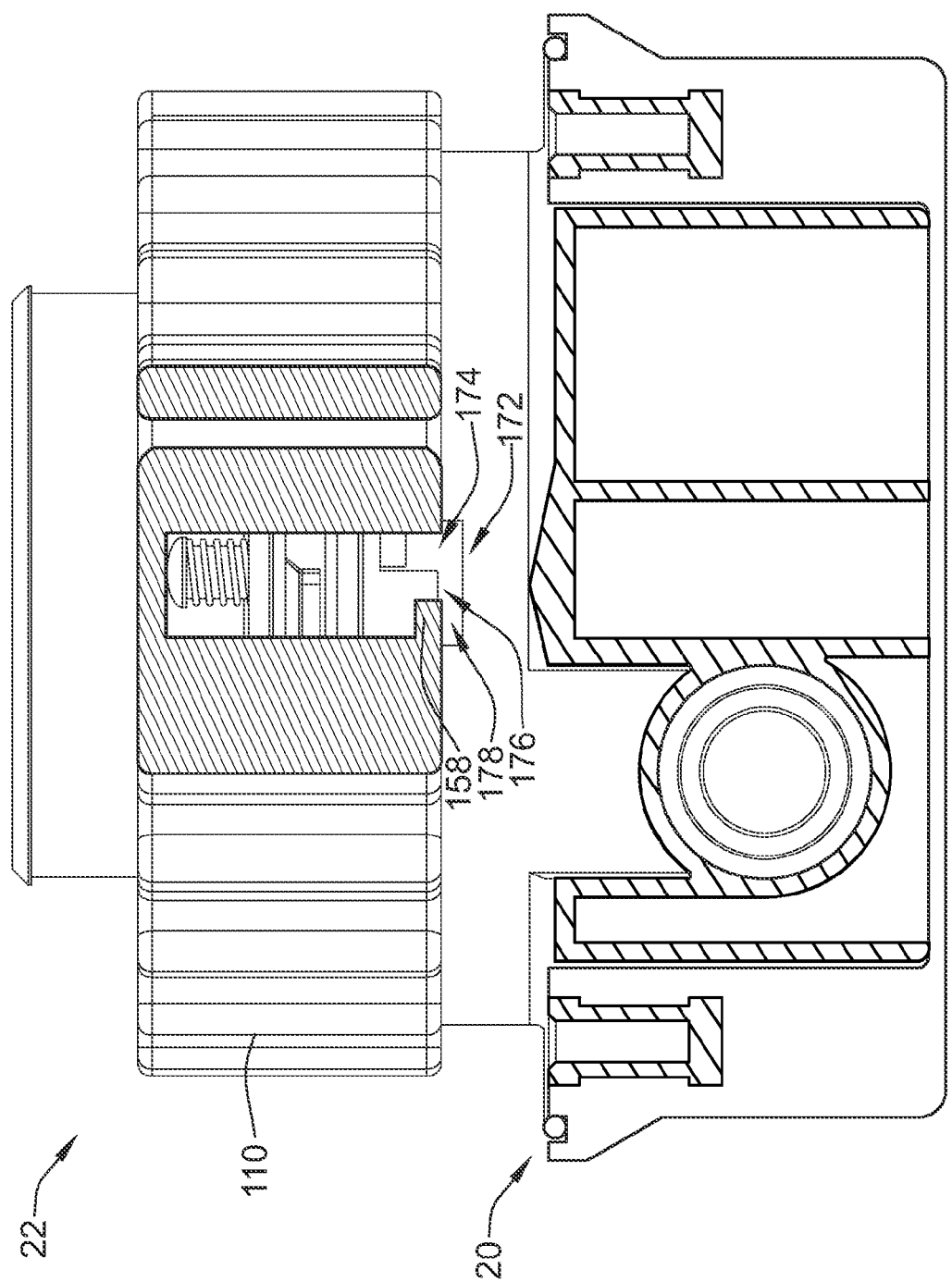
FIG. 12 is another partial sectional view of the service disconnect in a final mated position with respect to the receiver.

FIG. 12 is another partial sectional view of the service disconnect 22 in a final mated position with respect to the receiver 20, illustrating the handle 110 in a locked position. In the locked position, the projection 158 is captured in the third portion 178 of the locking channel 172. The projection 158 is captured in the third portion 178 of the locking channel 172 to lock handle 110 to the receiver 20. Rotation of the handle 110 in the first direction or in the second direction is restricted when the projection 158 is captured in the third portion 178.

The handle 110 may be unlocked by removing the projection 158 from the locking channel. For example, the projection 158 may be moved from the third portion 178 to the second portion 176, rotated in the second direction until the projection 158 is aligned with the first portion 174, and released so that the projection 158 is forced out of the first portion 174, such as to the position illustrated in FIG. 11.

Figure 13:
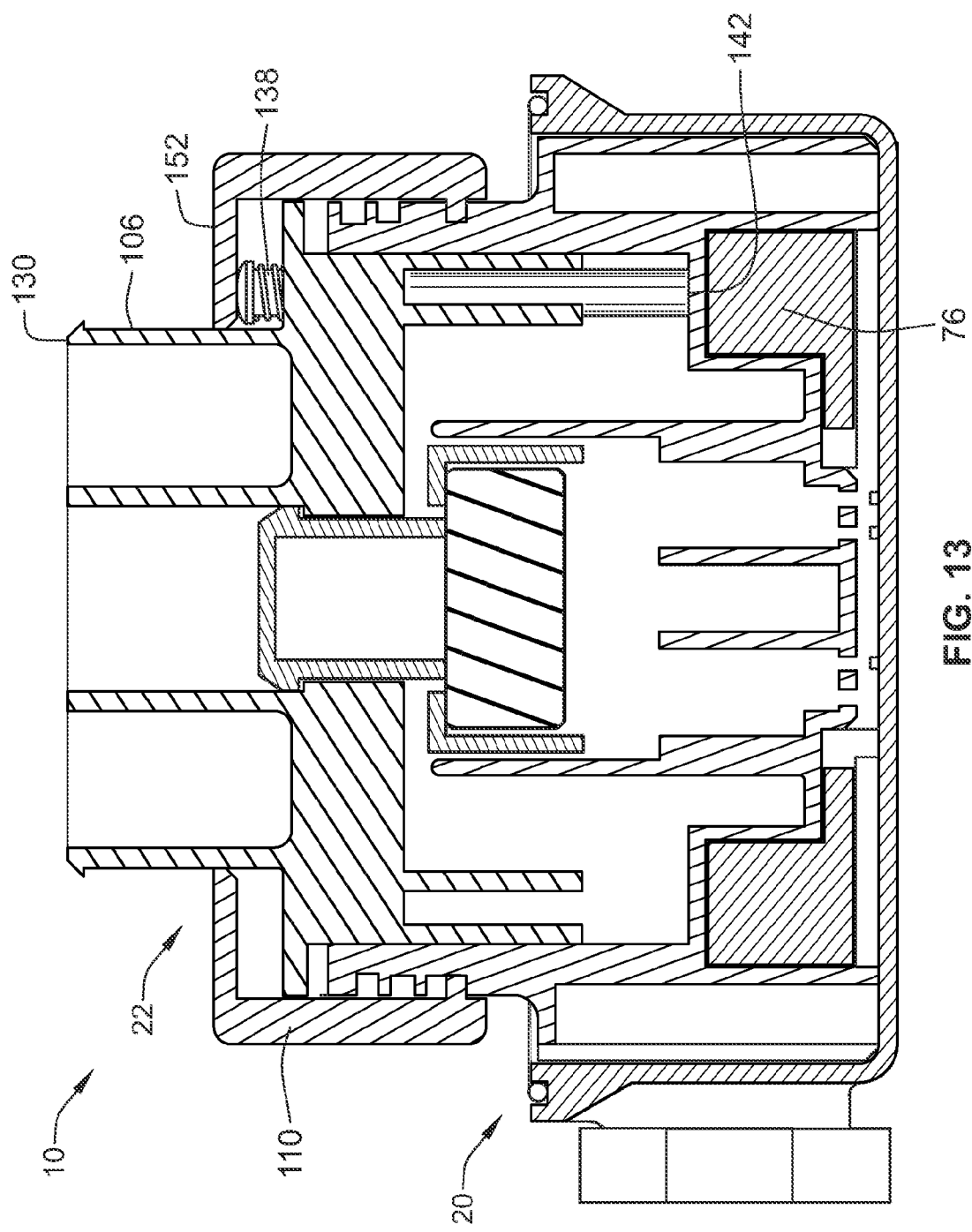
FIG. 13 is a cross-sectional view of the service disconnect assembly with the service disconnect in the position illustrated in FIG. 12.

FIG. 13 is a cross-sectional view of the service disconnect assembly 10 with the service disconnect 22 in the final mated position. The handle 110 is locked to the receiver 20. The top 152 of the handle 110 is recessed below the top 130 of the hub 106. The handle 110 forces the HVIL triggers 138 downward towards the HVIL sensors 76. Optionally, the trigger ends 142 may engage the HVIL sensors 76. Alternatively, the trigger ends 142 may be in very close proximity to the HVIL sensors 76. The sensitivity of the HVIL sensors 76 may be selected to change to the ON state with the trigger ends 142 are within a predetermined distance of the HVIL sensors 76. Once the HVIL triggers 138 are positioned close to the HVIL sensors 76, the HVIL sensors 76 may send a signal to the controller 82 (shown in FIG. 3) to allow high-voltage to flow through the power circuit 12.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A service disconnect assembly, the service disconnect assembly comprising:
a receiver configured to hold terminals of a power circuit;
a service disconnect removably coupled to the receiver, the service disconnect having a hub rotatably coupled to the receiver, the hub holding a trigger, the hub holding a terminal interconnect configured to electrically connect the terminals together, wherein the service disconnect is removable from the receiver to disconnect the terminals from one another, rotating the hub in a first direction drives the terminal interconnect into engagement with the terminals and rotating the hub in a second direction opposite to the first direction releases the terminal interconnect from the terminals; and a sensor held by the receiver adapted for sensing a proximity of the trigger to the sensor, the hub being initially received within the receiver such that the trigger is misaligned with the sensor, the hub rotated in the first direction to a final position, in the final position the trigger is aligned with the sensor.

2. The service disconnect assembly of claim 1, further comprising a high voltage interlock sensor system including the sensor held by the receiver and the trigger held by the hub, the sensor being configured to communicate signals with a power circuit controller to allow or restrict powering of the terminals based on the communicated signals, and the trigger being movable generally toward and away from the sensor as the handle is tightened and loosened, respectively, the sensor sending different signals to the controller based on the position of the trigger with respect to the sensor.

3. The service disconnect assembly of claim 2, wherein the hub and the handle are independently movable, the hub being initially coupled to the receiver by rotating the hub in a first direction to a final position, after the hub is in the final position, the handle is coupled to the receiver by rotating the handle in the first direction to a final position, to remove the service disconnect from the receiver, the hub is first loosened by rotating in a second direction, as the hub is loosened, the high voltage interlock sensor system triggers are moved away from the high voltage interlock sensor system sensors, thereby shutting down the high voltage power prior to the handle being loosened, the handle is then loosened by rotating in the second direction.

4. The service disconnect assembly of claim 1, further comprising a projection extending from one of the receiver and the hub, and further comprising a ramp extending from the other of the receiver and the hub, the projection engaging the ramp when the hub is rotated in the first direction to drive the hub into the receiver.

5. The service disconnect assembly of claim 1, wherein the service disconnect includes a holder discrete from the hub, the holder receives the terminal interconnect therein, the hub rotates relative to the holder such that the terminal interconnect maintains a constant angular position with respect to the terminals as the hub is rotated.

6. The service disconnect assembly of claim 1, wherein the service disconnect includes a holder having a top and a bottom, the holder receiving the terminal interconnect in the bottom, the holder including a finger extending from the top, the hub having an arcuate slot that receives the finger, the hub rotates relative to the holder such that the finger moves within the slot.

7. The service disconnect assembly of claim 1, wherein the service disconnect includes a holder having a top and a bottom, the hub including a bottom generally facing the top of the holder, a spring being positioned between the bottom of the hub and the top of the holder to bias the holder downward away from the bottom of the hub, a vertical position of the holder remaining constant as the hub is rotated in the first direction, a vertical position of the hub changing as the hub is rotated such that the hub is moved closer to the holder as the hub is rotated in the first direction.

8. A service disconnect assembly comprising:
a receiver configured to hold terminals of a power circuit;
a sensor held by the receiver, the sensor being configured to communicate signals with a controller for the power circuit to allow or restrict powering of the terminals based on the communicated signals; and
a service disconnect removably coupled to the receiver and holding a terminal interconnect configured to electrically connect the terminals together, the service disconnect having a handle rotatably coupled to the receiver, and the service disconnect having a trigger, wherein the trigger is movable generally toward and away from the sensor as the handle is tightened and loosened, respectively, the sensor sending different signals to the controller based on the position of the trigger with respect to the sensor.

9. The service disconnect assembly of claim 8, wherein the sensor is a proximity sensor configured to detect the proximity of the trigger to the sensor, the sensor sending a first signal to the controller when the trigger is a first distance from the sensor, and the sensor sending a second signal to the controller when the trigger is a second distance from the sensor that is different than the first distance.

10. The service disconnect assembly of claim 8, wherein the sensor detects one of engagement with the trigger or proximity with the trigger.

11. The service disconnect assembly of claim 8, wherein the trigger extends along a trigger axis between a trigger end and a distal end, the handle engages the distal end to force the trigger end toward the sensor as the handle is tightened.

12. The service disconnect assembly of claim 8, further comprising a spring engaging the trigger and forcing the trigger away from the sensor, the handle forces the spring to compress as the handle is tightened.

13. The service disconnect assembly of claim 8, wherein the receiver includes threads helically oriented on an outer surface thereof, the handle includes a projection that engages the threads, the handle being rotated to tighten or loosened the handle with respect to the receiver.

14. The service disconnect assembly of claim 8, wherein the receiver includes threads helically oriented on an outer surface thereof and the receiver includes a locking wall associated with the threads, the handle includes a projection that engages the threads, the projection engaging a locking wall to lock the handle to the receiver.

15. A service disconnect assembly comprising:
a receiver configured to hold terminals of a power circuit, the receiver includes a rim and a ramp extending from the rim at least partially circumferentially around the rim; and
a service disconnect removably coupled to the receiver to disconnect the terminals from one another, the service disconnect having a hub rotatably coupled to the receiver and a handle rotatably coupled to the receiver, the handle being rotatable with respect to the hub, the hub includes a projection extending therefrom engaging the ramp, the hub holding a terminal interconnect configured to electrically connect the terminals together;
wherein rotating the hub in a first direction drives the terminal interconnect into engagement with the terminals and rotating the hub in a second direction opposite to the first direction releases the terminal interconnect from the terminals, the ramp being angled downward to drive the hub downward as the hub is rotated in the first direction, and wherein rotating the handle in a first direction to a locked position locks the hub to the receiver and rotating the handle in a second direction to a released position allows the hub to be removed from the receiver.

16. The service disconnect assembly of claim 15, wherein the rim includes an outer surface and an inner surface defining a cavity, the cavity receives the hub and the terminal interconnect, the hub engages the inner surface of the rim and the handle engages the outer surface of the rim.

17. The service disconnect assembly of claim 15, wherein the rim includes a top edge and inner and outer surfaces extending from the top edge, the rim includes at least one inner opening extending into the rim from the inner surface and being open at the top edge, the rim includes at least one outer opening extending into the rim from the outer surface and being open at the top edge, the projection being received in the inner opening, the handle having at least one projection received in the outer opening.

18. The service disconnect assembly of claim 15, wherein one of the hub and the handle includes a latch to secure the handle and the together as a unit.

19. The service disconnect assembly of claim 15, further comprising a high voltage interlock sensor system including a sensor held by the receiver and a trigger held by the hub, the sensor being configured to communicate signals with a controller for the power circuit to allow or restrict powering of the terminals based on the communicated signals, and the trigger being movable generally toward and away from the sensor as the handle is tightened and loosened, respectively, the sensor sending different signals to the controller based on the position of the trigger with respect to the sensor.

* * * * *